Aug. 26, 1958  H. C. A. POTEZ  2,848,924
HEAD SUPPORTED BINOCULARS
Filed Oct. 18, 1955  2 Sheets-Sheet 1

Inventor
H.C.A. Potez

Aug. 26, 1958 H. C. A. POTEZ 2,848,924
HEAD SUPPORTED BINOCULARS
Filed Oct. 18, 1955 2 Sheets-Sheet 2
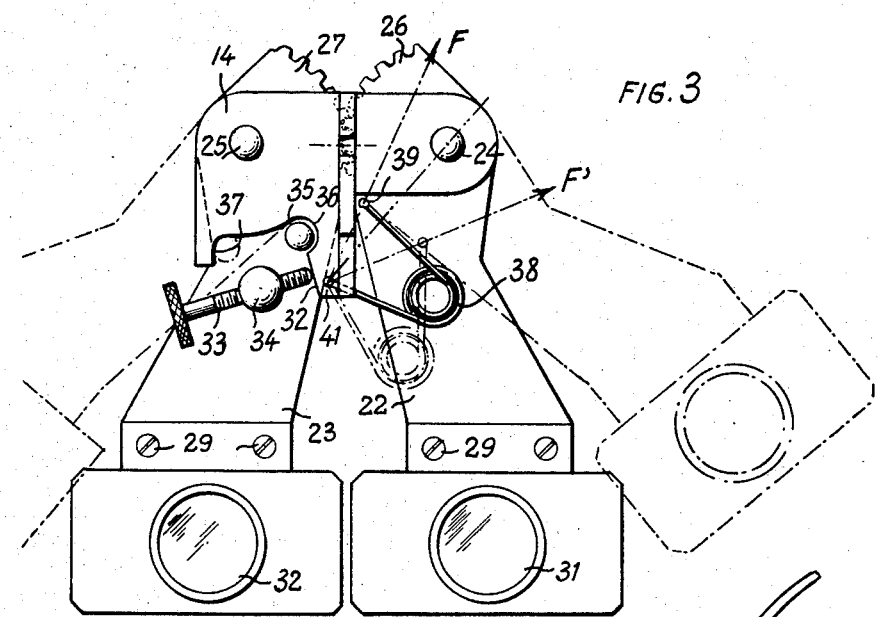
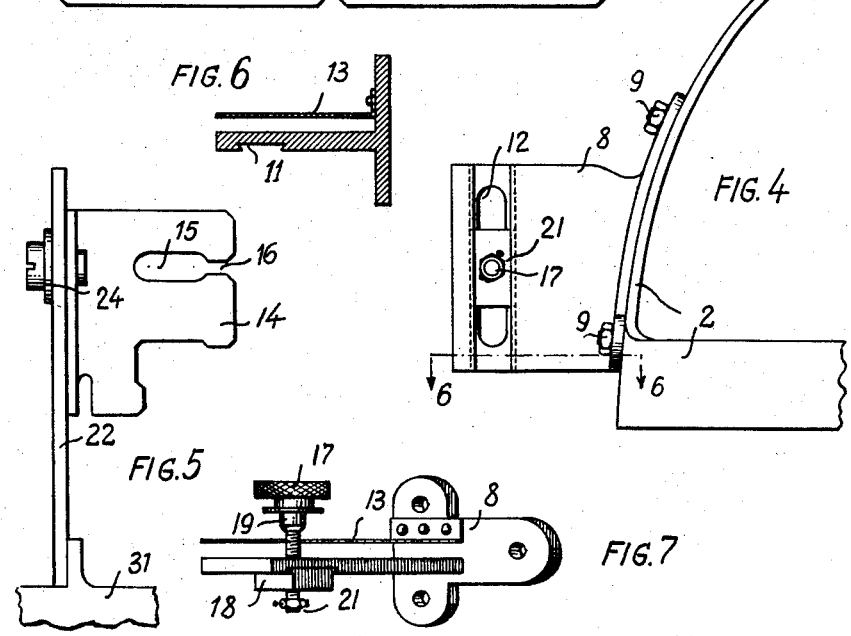
Inventor
H.C.A. Potez

2,848,924
HEAD SUPPORTED BINOCULARS

Henry Charles Alexandre Potez, Paris, France

Application October 18, 1955, Serial No. 541,269

Claims priority, application France October 27, 1954

3 Claims. (Cl. 88—36)

The present invention relates to optical devices, and, more particularly, optical devices such as binoculars, for instance, adapted to be carried on an observer's head.

The object of the invention is to provide a device of the aforesaid type, in which any tendency of the optical device to drop gradually from its correct position in front of the observer's eyes, under the action of gravity, is entirely precluded.

Such result is obtained, according to the invention, by providing means adapted to exert upon the optical apparatus proper, an upward pulling effect in order to counterbalance the weight of said apparatus.

In one embodiment, the said means consist of a counterweight, the mass of which is substantially equal to that of the optical apparatus, adapted to be placed at the rear of the observer's head and connected to said apparatus through a link passing over the observer's head.

It will be readily understood that with such an arrangement, not only the apparatus has no tendency to drop, but, furthermore, the whole assembly is balanced, so that the observer has no longer the disagreeable feeling that the apparatus has a tendency to dangle vertically.

It is of interest that such apparatus be capable of assuming two distinct positions on the observer's head, namely a service or observation position in which the eye-pieces of the optical apparatus are positioned in front of the observer's eyes, and a rest position in which said eye-pieces are out of the field of vision. In order that the balance of the device as a whole, as herein above defined, be maintained integrally in both aforesaid positions, the optical elements, according to another feature of the invention, are shifted from service to rest position, and vice-versa, in a plane which is vertical when the observer carries the device on his head with the latter in upright position. In this manner, the leverage of the forces exerted upon the link by both elements of the optical apparatus is not varied.

In one particular embodiment, the optical elements are carried by two arms pivoted on axes at right angles to the aforesaid vertical plane and carried by a front plate connected to the counterweight by the aforesaid link.

Further objects and advantages of the invention will be hereinafter described with reference to the accompanying drawings, given merely by way of example and in which:

Fig. 3 is, on a larger scale, a section taken on line 3—3 of Fig. 1.

Fig. 4 and Fig. 5 are side elevational views, on a larger scale, of the two parts which constitute the front articulation of the device.

Fig. 6 is a section taken on line 6—6 of Fig. 4 and Fig. 7 is a plan view of a portion of Fig. 4.

Figures 1, 2:
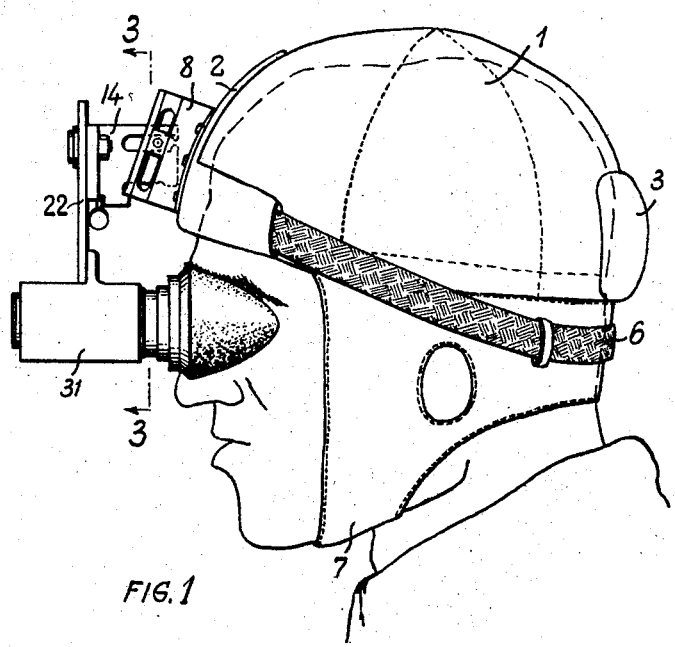
Fig. 1 is a side elevational view of an optical apparatus assembly according to the invention, set on an observer's head.
Fig. 2 illustrates, in perspective and on a smaller scale, a modification of the cap of the device of Fig. 1.

Referring first to Fig. 1, 1 is a cap fitting exactly over an observer's head and which carries, at the fore portion thereof, a front plate 2 which serves as a support for the optical apparatus proper, i. e. binoculars in the present instance and, at the rear portion thereof, a counterweight 3. The mass of the counterweight is so determined as to counterbalance substantially the weight of the optical apparatus proper. It will be noted that the counterweight 3 is directly connected to the front plate 2 through the upper portion of the cap 1, so that it is unable to move with respect to the observer's head and so that the binoculars, therefore, are not likely to slip downwards.

Referring now to Fig. 2, a modification of the cap will be seen which is constituted by a ring member 4 fitting round the head and an upper strap 5 forming a sort of helmet crest. The ring member 4 and the upper strap 5 are connected, at the front by the front plate 2, and at the rear, by the counterweight 3. The latter, therefore, is again perfectly fastened to the observer's head.

Reverting now to the broad arrangement of Fig. 1, there will be seen, furthermore an auxiliary band 6 connected to the front plate 2 and which passes behind the nape of the neck, as well as a chin-strap 7.

On the forward face of the front plate 2, a bracket 8 (see also Figures 3 to 7) is secured by means of three bolts 9, for instance. One face of the bracket 8 has a dovetail groove 11 the bottom of which is cut out so as to form a slot 12. A spring blade 13, also secured to the bracket 8, extends parallel with one face thereof and at some distance therefrom. Between said face of the bracket 8 and the spring blade 13 is inserted a wall of a T-shaped movable part having a slot 15 which opens into one edge of said part through a narrower slot 16. A knurled thumb-screw 17 is screwed in a nut 18 adapted to slide in a dovetail groove 11 and it extends simultaneously through the slot 15 of the movable part, the slot 12 of the bracket 8 and a slot identical with the latter (not shown in the drawings) cut through the spring blade 13. The screw threaded portion of the screw 17 is able to pass through the slot 16 of the movable part and it has a cylindrical portion 19 of a larger diameter, substantially equal to the width of the slot 15 of the movable part. In order to prevent the screw 17 from being fully released from the nut 18, a small nut 21 is secured on the end of the screw as by means of a split cotter.

On the other face of the movable part 14, two arms 22, 23 are pivoted on studs 24, 25 respectively. The movements of these arms are made symmetrical by means of toothed sectors 26, 27 respectively rigid with these two arms and in mesh with each other.

The optical elements 31, 32 are secured at the lower ends of the arms 22, 23 respectively, as by means of screws 29.

The movement of the arms toward each other is limited by an abutment 32 constituted by the edge of the movable part 14 against which bears the end of a knurled adjusting thumb-screw mounted in a stud 34 rigid with the arm 23. The limit of the movement of the arms toward each other is obtained by a stud 35 rigid with the arm 23 and which is also adapted to bear against the edge of the movable part 14, in a notch 36 of the latter. This stud 35 also serves the purpose of limiting the maximum angular setting of the arms by cooperating with another notch 37 of the part 14.

Finally both arms are resiliently urged toward each other, i. e, toward the position shown in full lines in Fig. 3, and away from each other, i. e. toward the position shown in dotted lines, by means of an over-center device which comprises a coil spring 38 one end of which is threaded in a hole 39 of the arm 22 and the other end of which is threaded in a hole 41 of the part 14.

The operation of the device which has just been described is self-explanatory: the cap being in position on the observer's head, he is able, instantaneously and by means of a single hand, to move the optical device from the near or service position into the retracted or rest position and vice-versa. The optical elements, each time, are strictly restored into their correct position and orientation with respect to the observer's eyes by virtue of the structure of the device which may be adjusted as follows:

The distance between the eye-pieces of the optical elements 31, 32 may be adjusted by means of the screw 33, and their height, orientation and distance from the eyes, by a sliding movement of the movable part 14 on the stationary part 8, the set screw 17 being released beforehand.

The assembly comprised of the movable part 14 and the optical elements may be easily removed from the rest of the device. To this effect, it suffices to release the screw 17 so far as to allow its cylindrical portion 19 of larger diameter to move axially out of the slot 15 of the movable part. At this moment, the movable part 14 may be easily cleared forward since the screw-threaded portion of the screw 17 is able to pass through the narrow slot 16 of said part.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention.

What is claimed is:

1. A binocular support comprising, in combination, a portable supporting means adapted to be carried on the head of a wearer, a forwardly projecting first plate member attached to the front of said supporting means and provided with a substantially vertical slot, a second plate member having a front portion provided with two outwardly extending wings and a rear portion adapted to contact with one side of said first plate member, said rear portion having a substantially horizontal slot formed therein, a pair of arms secured to said wings and carrying each one barrel of said binocular, and clamping means including a screw mounted through said vertical and horizontal slots to permit relative angular, vertical and horizontal adjustment of said plate members when said screw is in untightened condition and clamping of said plate members in the adjusted position of said binocular upon tightening of said screw to thereby hold said binocular to the requirements of the wearer's eyesight.

2. A binocular support comprising, in combination, a portable supporting means adapted to be carried on the head of a wearer, a forwardly projecting first plate member attached to the front of said supporting means and provided with a substantially vertical slot, a second plate member having a front portion provided with two outwardly extending wings and a rear portion adapted to contact with one side of said first plate member, said rear portion being provided with a substantially horizontal slot extending from the rear edge of said second plate member towards said front portion thereof and said horizontal slot having a front length portion and a rear length portion of smaller width than said front length portion, a pair of swingable arms piovtally secured to said wings and carrying each one barrel of said binocular, means for adjusting the interpupillary distance between the two barrels of said binocular, and clamping means including a screw member having a head portion conforming in diameter to said vertical slot and to said front length portion of the horizontal slot and a stem conforming in diameter to said rear length portion of the horizontal slot, whereby said stem and said head portion of the screw member may be passed through said vertical slot and through said front length portion of the horizontal slot to permit relative angular, vertical and horizontal adjustment of said plate members and clamping thereof in the adjusted position, said screw member also permitting separation of said plate members upon withdrawal of said head portion of the screw member from said horizontal slot.

3. A binocular support comprising, in combination, a portable supporting means adapted to be carried on the head of a wearer, a forwardly projecting first plate member attached to the front of said supporting means and provided with a substantially vertical slot, a second plate member having a front portion provided with two outwardly extending wings and a rear portion adapted to contact with one side of said first plate member and provided with a substantially horizontal slot, clamping means including a screw member mounted through said vertical and horizontal slots to clamp said first and second plates together, a pair of swingable arms pivotally secured to said wings and carrying each one barrel of said binocular, means providing simultaneous swinging movement of said arms towards each other to operative positions and upwardly to inoperative positions out of the wearer's vision, and a spring means having one end attached to one of said wings and its other end attached to the swingable arm secured to the other wing at such points as to provide a dead center position of said spring means when said arms are brought against the action of said spring means to an intermediate position between their operative and inoperative positions, the arrangement being such that said spring means urges said arms in one direction or the other relative to said intermediate position thereof.

References Cited in the file of this patent

UNITED STATES PATENTS

| 1,356,708 | Goodyear | Oct. 26, 1920 |
| 2,517,892 | Larrabee et al. | Aug. 8, 1950 |
| 2,649,019 | Hartline et al. | Aug. 18, 1953 |

FOREIGN PATENTS

| 747,250 | Germany | Sept. 18, 1944 |